UNITED STATES PATENT OFFICE.

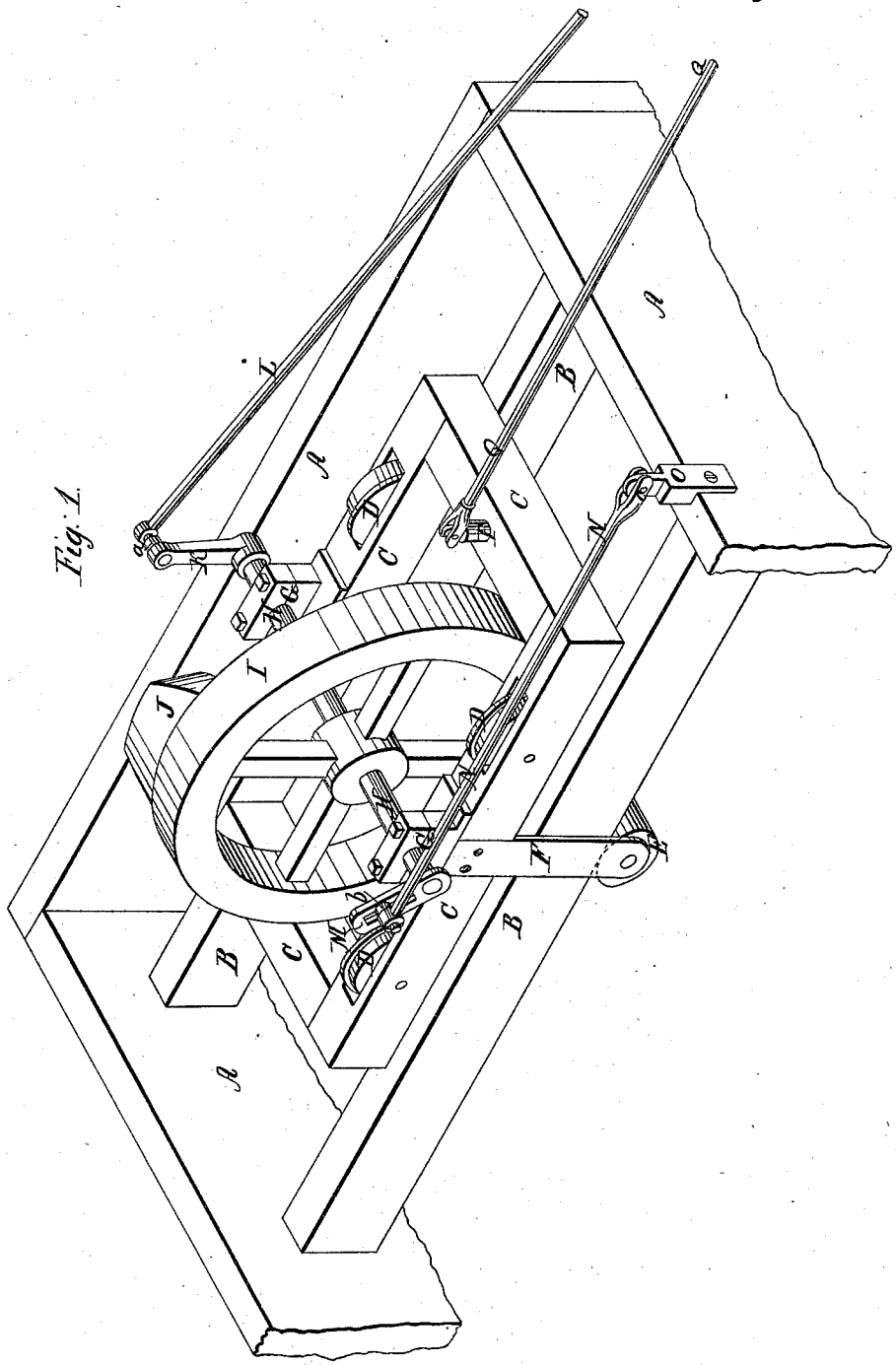

MATHAUS KAEFER, OF ALEXANDRIA, PENNSYLVANIA.

TRANSMITTING MOTION.

Specification of Letters Patent No. 17,222, dated May 5, 1857.

*To all whom it may concern:*

Be it known that I, MATHAUS KAEFER, of Alexandria, in the county of Huntingdon and State of Pennsylvania, have invented certain new and useful Improvements in the Manner of Hanging a Weighted Fly or Balance Wheel for Transmitting Motion to Machinery; and I do hereby declare the following to be a full, clear, and exact description of the same, reference being had to the accompanying drawing, making a part thereof, and which represents in perspective the manner in which I accomplish the desired end.

To enable others skilled in the art to make and use my invention, I will proceed to describe the same with reference to the drawing.

A, represents a frame in which are two ways B, B, for supporting a carriage C, provided with flanged wheels D, D, D, D, upon which said carriage traverses said ways B, and in order to keep the carriage on its ways, I further provide it with additional wheels or rollers E (one only being seen in the figure, but both alike) connected to arms F, which rollers take under the ways or rails B, and prevent the jumping of the carriage and hold it to its track.

In suitable boxes G on the carriage C, I support the journals of a shaft H, which carries a fly or balance wheel I, loaded with a weight J. On one end of the shaft H, is a crank K, to a wrist pin $a$, in which is connected one end of a rod or pitman L, the other end of said rod or pitman, being connected to any first mover, from which the power to drive the machinery is derived, whether steam, water, or animal power, and to the opposite side or end of the shaft H, from the crank L, is affixed another crank M, standing at a quarter circle or 90° from the crank K. This crank M, is slotted so as to receive a wrist pin $b$, that can be adjusted in said slot at pleasure. To the wrist pin $b$, is attached one end of a connecting rod N, the other end of said rod being pivoted at $c$ to an arm O, permanently affixed to the frame A. The adjustment of the wrist pin $b$ in the crank M, regulates the extent of traverse of the carriage C, on its ways B.

A standard or arm P, is set in the carriage C, to which one end of a pitman Q, is attached, and the other end of said pitman may be connected in any well known manner, to the machinery to be driven. The stroke of the pitman Q, is regulated by the traverse movement of the carriage C, on its ways B, and the movement of the carriage in turn is regulated by the adjustment of the wrist pin $b$ in the crank M. By this arrangement, instead of any jar or jumping of the fly wheel, as it passes the dead points, the carriage yields to the centrifugal force of the wheel, and an easy motion is transmitted from said carriage to the machinery to be driven.

Having thus fully described the nature of my invention, what I claim therein as new and desire to secure by Letters Patent is—

Hanging a loaded fly or balance wheel, on a traveling carriage, so that said carriage shall yield to the momentum of the fly wheel as it passes the dead points, substantially in the manner herein set forth and described.

MATHAUS KAEFER.

Witnesses:
  A. B. STOUGHTON,
  E. COHEN.